June 5, 1923.

C. L. McCUEN

SEALED BEARING

Filed May 2, 1921

1,457,584

INVENTOR:
CHARLES L. McCUEN,
BY Cheever & Cox
ATTYS.

Patented June 5, 1923.

1,457,584

UNITED STATES PATENT OFFICE.

CHARLES L. McCUEN, OF CHICAGO, ILLINOIS, ASSIGNOR TO RESOLUTE MANUFACTURING COMPANY, OF CHICAGO, ILLINOIS, A CORPORATION OF ILLINOIS.

SEALED BEARING.

Application filed May 2, 1921. Serial No. 465,989.

*To all whom it may concern:*

Be it known that I, CHARLES L. McCUEN, a citizen of the United States, residing at Chicago, in the county of Cook and State of Illinois, have invented a certain new and useful Improvement in Sealed Bearings, of which the following is a specification.

My invention relates to sealed radius bearings and constitutes an improvement over the form shown in my copending application filed October 11, 1920, Serial No. 416,048, allowed June 21, 1921. One of the particular objects of my present invention is to increase the flexibility of the bearing. In the present case, I have produced what may be termed a "floating" bearing in the sense that the concave spherical sealing element is shiftable transversely to the axis instead of being fixed as in the previous case. This is accomplished without losing any of the valuable characteristics of the previous type. Another object is to promote ease and economy of manufacture and also durability. In the previous type the concave spherical sealing surface, being integral with the wall of the receptacle, had to be formed in situ. According to the present form of design this surface is formed upon a separate piece which may be manufactured independently. The fact that it is an independent part makes it possible to construct it of hardened steel or some other material that might not be practicable to use for the entire receptacle. This also makes for economy and durability as well as facilitating quantity production.

I accomplish these objects by the mechanism illustrated in the accompanying drawings in which—

Figure 1:
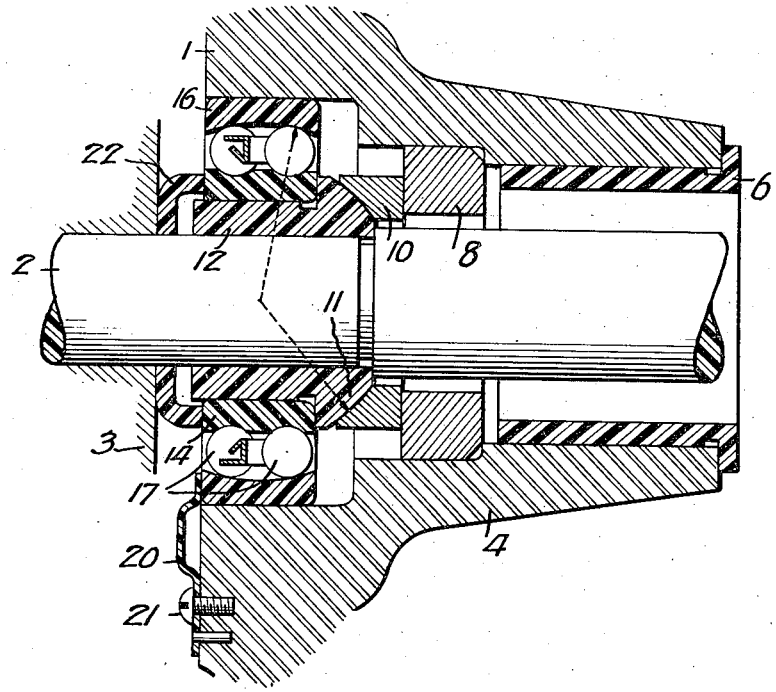
Figure 2:
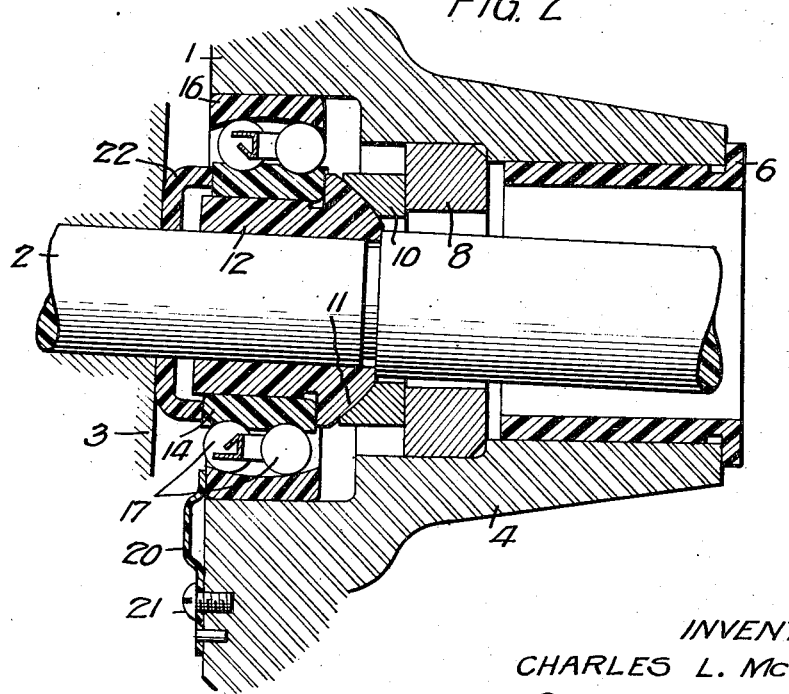

Figure 1 is an axial section of the device showing the shaft in normal central position, and Figure 2 is a similar view in which the shaft is shown inclined at an angle.

Like numerals denote like parts throughout the several views.

Referring to the drawings, 1 represents a fragment of the wall of the receptacle within which the fluid is to be retained. The inside of the wall is toward the left in the drawing. The shaft 2 is rotated by any appropiate means (not shown). Within the receptacle the shaft may actuate any desired element as for example the eccentric 3, a fragment of which is illustrated. The wall has a cylindrical projection or boss 4 which may be of any desired length to accommodate an element 6 which typifies a stuffing box gland, or other appropriate device. The boss is internally chambered to accommodate a wearing and sealing ring 8. The central aperture of this ring is appreciably larger than the shaft, the purpose being to permit free transverse motion of the latter. The ring fits snugly so as to prevent the escape of any fluid past its outer circumference.

In contact with the wearing ring is a spherically concave ring 10 whose internal diameter is larger than the shaft and whose concave spherical surface faces the inside of the receptacle. This concave ring makes surface contact with a ring 11 which has a convex spherical surface adapted to make close contact with the concave surface of ring 10. Ring 11 has an integral sleeve 12 in which the shaft bears. Sleeve 12 is supported by a ball bearing having an inner ball race 14 and an outer ball race 16. The inner race fits over sleeve 12 and has annular grooves for the balls 17. The outer ball race has a spherical internal surface concentric with the spherical surfaces of the rings 10 and 11. It will be evident that the ball bearing constitutes a "radius ball bearing" in consequence of the fact that when the outer race is viewed in axial section its inner surface conforms to an arc struck upon a radius the inner end whereof is at the axis of the shaft. According to the present design the outer race 16 is held in place in the chambered wall by a clip 20 fastened to the wall by a screw 21 while the inner race is held by a washer 22 which also forms a spacer to keep the crank 3 at a proper distance from the wall.

The operation will now be readily understood. The device constitutes a radius bearing in the sense that the parts conform to radii which permit the shaft to change its angle of inclination without becoming unseated. The bearing is also a sealed bearing for it prevents the escape of fluid from the receptacle. The ring 8 makes a fluid-tight contact with the stationary wall of the receptacle, the ring 10 makes fluid-tight contact with the ring 8 on one side and with the ring 11 on the opposite side, and the ring 11 and sleeve 12 make fluid-tight contact with the shaft. Thus there is an impervious connection between the shaft and the wall and the fluid will be effectually retained within the receptacle.

It will be understood that in quantity production, it is not always possible to produce as accurate work as where each part is made especially for its cooperating part and particularly fitted to it. In the present case, it is conceivable that the crank 3 might be mounted slightly higher or lower than expected. In my construction this is made unimportant by the fact that the ring 10 is vertically slidable upon the wearing ring 8 and consequently any inaccuracies are immediately compensated for. It may also happen that the borings which form the chamber in the receptacle wall 1 are not accurately centered or that the ball bearings may vary slightly in size or adjustment. Such discrepancy is likewise neutralized in my construction for the ring 10 which in a sense belongs to the shaft, is movable with respect to the ring 8, which in a sense belongs to the stationary wall. The consequence is that my construction lends itself to quantity production and always insures correct seating of the parts. As the rings 8 and 10 are small, separate pieces compared to the receptacle itself, they may be made of special and expensive material which will greatly increase the durability of the mechanism without greatly increasing its cost.

Having thus described my invention what I claim as new and desire to secure by Letters Patent is:—

1. In a sealed bearing, the combination, with the shaft, of a radius ball bearing having an outer race which is stationary and an inner one which is tiltable in unison with the shaft, a pair of cooperating elements having interfitting spherical surfaces concentric with the ball bearing, one of said elements being mounted on the shaft and the second being adapted to resist the endwise thrust of its said cooperating element and being movable in a plane at right angles to the normal axis of the shaft, and means against which said second cooperating element abuts for absorbing the thrust, and on which said second cooperating element is freely movable in a plane at right angles to the normal axis of the shaft.

2. In a sealed bearing, the combination of a shaft, a stationary support, a wearing ring mounted in said support and having a flat wearing surface at right angles to the normal position of the shaft, a radius ball bearing encircling the shaft and having an inner and an outer ball race, the outer ball race being carried by the stationary support and the inner one being tiltable in unison with the shaft, a pair of cooperating elements having interfitting spherical surfaces concentric with the radius ball bearing, one of said elements being mounted on the shaft and the other having a flat wearing surface bearing against the flat wearing surface of the wearing ring whereby the last mentioned element may float in a direction crosswise of the shaft.

3. A floating, sealed, anti-friction, radius bearing comprising a wall of the receptacle to be sealed, a shaft, a ball bearing having balls interposed between two ball races, and two interfitting members having close fitting spherical surfaces, one of said members being imperviously related to the shaft and the other being imperviously related to but transversely slidable with reference to said wall, one of the ball races having a spherical surface concentric with the first mentioned spherical surfaces.

4. A floating, sealed bearing having, in combination, a wall of the receptacle to be sealed, a shaft passing through the wall and having a spherical portion imperviously related to the shaft, a ring having a spherical portion making surface contact with the first mentioned spherical portion, a second ring inserted in the wall and making fluid-tight connection therewith, the two rings having flat wearing surfaces arranged transversely to the shaft whereby the first mentioned ring may slide transversely of the bearing, the bearing thus being sealed and the shaft being able to rotate, tilt and float.

5. In a floating, sealed, anti-friction bearing, the combination of a wall of the receptacle to be sealed, a shaft passing through the wall and having a spherical portion imperviously related to the shaft, a ball bearing having an inner and an outer ball race with balls interposed between them, a ring having a spherical portion making surface contact with the first mentioned spherical portion, a second ring inserted in the wall and making fluid-tight connection therewith, the two rings having flat wearing surfaces arranged transversely to the shaft whereby the first mentioned ring may slide transversely of the bearing, one of the ball races having a spherical surface concentric with the first mentioned spherical portion.

In witness whereof, I have hereunto subscribed my name.

CHARLES L. McCUEN.